United States Patent
Russell et al.

(10) Patent No.: US 7,921,944 B2
(45) Date of Patent: Apr. 12, 2011

(54) COMPRESSION SYSTEM FOR INTERNAL COMBUSTION ENGINE INCLUDING A ROTATIONALLY UNCOUPLED EXHAUST GAS TURBINE

(75) Inventors: John D. Russell, Portland, OR (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 635 days.

(21) Appl. No.: 11/926,526

(22) Filed: Oct. 29, 2007

(65) Prior Publication Data

US 2009/0107142 A1    Apr. 30, 2009

(51) Int. Cl.
*B60W 10/06* (2006.01)
*B60W 10/08* (2006.01)
(52) U.S. Cl. ............... 180/65.265; 180/309; 60/607; 123/559.1
(58) Field of Classification Search ........... 180/65.31, 180/65.265, 65.275, 309; 60/600, 601, 607, 60/608, 280; 123/559.1, 565
See application file for complete search history.

(56) References Cited

U.S. PATENT DOCUMENTS

| | | | |
|---|---|---|---|
| 5,105,624 A | | 4/1992 | Kawamura |
| 5,937,807 A | * | 8/1999 | Peters et al. ............... 123/90.15 |
| 6,170,469 B1 | * | 1/2001 | Itoyama et al. ............... 123/480 |
| 6,595,183 B1 | * | 7/2003 | Olofsson ........................ 123/315 |
| 6,637,205 B1 | * | 10/2003 | Ahmad et al. .................. 60/608 |
| 6,647,724 B1 | | 11/2003 | Arnold et al. |
| 6,871,498 B1 | * | 3/2005 | Allen et al. ..................... 60/608 |
| 6,880,337 B2 | | 4/2005 | Masuda |
| 2007/0151241 A1 | * | 7/2007 | Arnold ........................ 60/605.1 |

* cited by examiner

*Primary Examiner* — J. Allen Shriver, II
*Assistant Examiner* — John D Walters
(74) *Attorney, Agent, or Firm* — Allan J. Lippa; Alleman Hall McCoy Russell & Tuttle LLP (57) ABSTRACT

As one example, a vehicle propulsion system is provided. The system includes: an with an intake air compressor and an exhaust gas turbine. Further, a control is provided to operate the compressor at a different speed than the turbine, at least under an operating condition, and to adjust an amount of opening overlap between engine valves in response to a rotational speed of the compressor.

24 Claims, 9 Drawing Sheets

COMPRESSION SYSTEM FOR INTERNAL COMBUSTION ENGINE INCLUDING A ROTATIONALLY UNCOUPLED EXHAUST GAS TURBINE

BACKGROUND AND SUMMARY

Internal combustion engines can utilize turbochargers or superchargers to obtain increased intake air pressure to enable increased engine performance. Turbochargers typically include an intake air compressor rotationally coupled with an exhaust gas turbine, where the turbine provides thrust to the compressor by extracting energy from the exhaust flow. Some of turbochargers may include a motor to assist the compressor develop sufficient thrust when the turbine is unable to extract enough energy from the exhaust flow or where the exhaust flow has insufficient energy to power the compressor.

The inventors of the present application have recognized that one disadvantage of the above turbocharger is that the compressor and turbine are rotationally coupled, which can limit the operating state at which the compressor and turbine can be operated. For example, compressor surge can be reduced by increasing an amount of exhaust flow bypassing the turbine, which can be achieved by increasing an opening of a wastegate arranged in a bypass passage of the turbine. By reducing the amount of exhaust energy that is extracted by the turbine, the speed and resulting boost pressure provided by the compressor can be reduced due to the rotational coupling, thereby reducing or eliminating compressor surge. However, by increasing the bypass flow of exhaust gases, the efficiency of the engine system may also be reduced since a greater amount of exhaust energy is transferred to ambient by way of the wastegate without being extracted by the turbine.

The inventors have provided various approaches, disclosed herein, that may address at least some of the above issues by a vehicle propulsion system that comprises: an internal combustion engine including at least one cylinder; an intake air compressor communicating with the cylinder via an intake valve; an electric machine rotationally coupled to a shaft of the compressor; an exhaust gas turbine communicating with the cylinder via an exhaust valve; and a control system configured to operate the compressor at a different speed than the turbine, at least under an operating condition, and to adjust the electric machine responsive to conditions of compressor surge to reduce the surge while continuing to extract energy from an exhaust flow of the engine via the exhaust gas turbine. Note that the turbine wastegate may still be used with this approach to control turbine operation, however, by adjusting the electric machine rotationally coupled with the compressor to adjust compressor speed and/or torque, surge may be reduced or avoided, enabling a reduction in the amount of exhaust flow that is diverted through the turbine bypass. In some examples, the wastegate and turbine bypass passage may be entirely eliminated, thereby reducing the cost and complexity of the engine system. By reducing the turbine bypass, at least under some conditions, the turbine can be operated to generate electrical energy via a second electric machine rotationally coupled with the turbine, which in turn can be used power the electric machine of the compressor, or other loads.

As another approach described by U.S. Pat. No. 6,647,724, some of the potential drawbacks of a rotationally coupled compressor and turbine can be addressed by providing a turbocharger that includes an electric compressor to boost intake charge pressure supplied to an internal combustion engine and an electric turbine to generate electrical power from exhaust received from the engine. By operating the electric compressor mechanically independently of the turbine, turbocharger lag may be reduced during conditions where a more rapid increase in boost pressure is requested. However, the inventors of the present disclosure have also recognized that adjustment to the compressor operating state independent of the operating state of the turbine can impact the amount of exhaust gas residuals that are retained in the engine cylinders for a given operating condition. If an insufficient amount or concentration of residuals are retained by the engine or if residual retention is too great for the given operating conditions, then the efficiency of the system may be reduced, misfire may occur, and/or noise, vibration, and harshness (NVH) of the engine may be increased.

The inventors have provided another approach, disclosed herein, that addresses at least some of the above issues of residual retention, which includes as one example, a vehicle propulsion system, comprising: an internal combustion engine including at least one cylinder; an intake valve operable to selectively admit at least intake air to the cylinder; an exhaust valve operable to selectively exhaust products of combustion from the cylinder; an intake air compressor communicating with the cylinder via the intake valve; an exhaust gas turbine communicating with the cylinder via the exhaust valve; and a control system configured to operate the compressor at a different speed than the turbine, at least under an operating condition, and to adjust an amount of opening overlap between the intake valve and the exhaust valve in response to a rotational speed of the compressor. The control system may also adjust the amount of opening overlap in response to the rotational speed of the turbine or a speed difference between the turbine and compressor. In this way, valve timing may be adjusted to retain a prescribed amount of residuals in the engine cylinders even when the operating state of the compressor and turbine are adjusted independently of each other.

The inventors of the present disclosure have recognized further issues with regards to the previous approaches. For example, some engines may operate in one of a plurality of different combustion modes, which can each utilize different levels of boost as well as different levels of exhaust gas residual production and retention. If boost is simply increased by adjusting the compressor, the amount and/or concentration of residuals retained by the cylinders may also change, thereby potentially impacting the performance of the engine depending on the combustion mode presently utilized. For example, two stroke combustion modes can have higher residual retention rates than four stroke combustion modes, since the valve overlap timings may be shorter in the two stroke mode. As another example, spark ignition combustion modes may utilize a lower concentration of residuals from a previous combustion cycle than a homogeneous charge compression ignition mode where autoignition is utilized to ignite the fuel and air mixture.

The inventors have provided yet another approach, disclosed herein, that addresses at least some of the above issues relating to residual retention, which includes as one example, a method of operating an engine, comprising: during a first operating condition, operating the engine in a first combustion mode while adjusting the compressor to provide a higher level of boost to the engine and operating the turbine at a first speed difference relative to the compressor; and during a second operating condition, operating the engine in a second combustion mode while adjusting the compressor to provide a lower level of boost to the engine and operating the turbine at a second speed difference relative to the compressor. In this way, a suitable level of boost can be provided to the engine based on the combustion mode presently being used, while also retaining an amount of exhaust gas residuals in the engine cylinders that is appropriate for the selected combustion mode.

The inventors of the present disclosure have recognized still further issues associated with an engine utilizing a rotationally uncoupled compressor and turbine pair. For example, during warm-up of the engine, if the turbine is operated to extract exhaust gas energy from the exhaust stream, then the exhaust treatment devices may take longer to reach their prescribed operating temperature. However, during these conditions, additional boost pressure may be requested. Thus, as one example, a method of operating a vehicle propulsion system including an internal combustion engine having an intake air compressor and an exhaust system including an exhaust turbine having a turbine generator and an exhaust treatment device arranged downstream of the turbine is provided. The method comprises: during a lower temperature condition of the exhaust system, operating the turbine generator to convert a lesser amount of exhaust gas energy produced by the engine to electrical energy and operating the compressor motor at a first speed difference relative to a speed of the turbine generator; and during a higher temperature condition of the exhaust system, operating the turbine generator to convert a greater amount of exhaust gas energy to electrical energy and operating the compressor motor at a second speed difference relative to a speed of the turbine generator less than the first speed difference. In this way, the amount of exhaust gas energy removed from the exhaust flow can be adjusted in response to the temperature of the exhaust treatment device to promote rapid heating of the exhaust system, while also providing sufficient boost pressure to the engine by way of the compressor.

The inventors of the present disclosure have recognized still further issues. For example, during some operating conditions, a reduced level of engine boost may be prescribed in order to meet the torque request of the vehicle operator, while during other operating conditions, an increased level of engine boost may be prescribed. The inventors have recognized that a reduction in engine boost, facilitated by reducing compressor speed and/or torque, need not necessarily be accompanied by a corresponding reduction in turbine torque or speed when the turbine is rotationally uncoupled from the compressor. For example, during an idle state of the engine, the turbine may be operated to extract energy from the exhaust flow even while the compressor is not operated or when the compressor is operated to a lesser extent. However, the compressor can serve as an obstruction to the intake system during conditions where additional boost is not prescribed for the given engine operating state. Thus, engine efficiency can be reduced during compressor inactivity since the engine entrains air through the compressor.

As such, the inventors have provided an approach that addresses this issue, as one example, by a method of operating an internal combustion engine including a first intake air compressor rotationally coupled with a first electric machine and an exhaust turbine rotationally coupled with a second electric machine, the method comprising: in response to a first operating state of the engine: increasing a flow of intake air through a bypass passage of the compressor relative to a flow of intake air through the compressor by opening a compressor bypass valve; and generating a first amount electrical energy with the second electric machine by extracting exhaust gas energy flowing from the engine via the turbine; and in response to a second operating state of the engine: decreasing the flow of intake air through the bypass passage of the compressor relative to the flow of intake air through the compressor by closing the compressor bypass valve; supplying electrical energy to the first electric machine to increase the rotational speed of the compressor; generating a second amount of electrical energy greater than the first amount with the second electric machine by extracting exhaust gas energy from the engine via the turbine; and adjusting the speed of the turbine relative to the compressor to vary the second amount of electrical energy generated by the second electric machine. In this way, engine efficiency may be increased during conditions where a lower amount of boost is requested or where the compressor is inactive.

DETAILED DESCRIPTION

Figure 1:
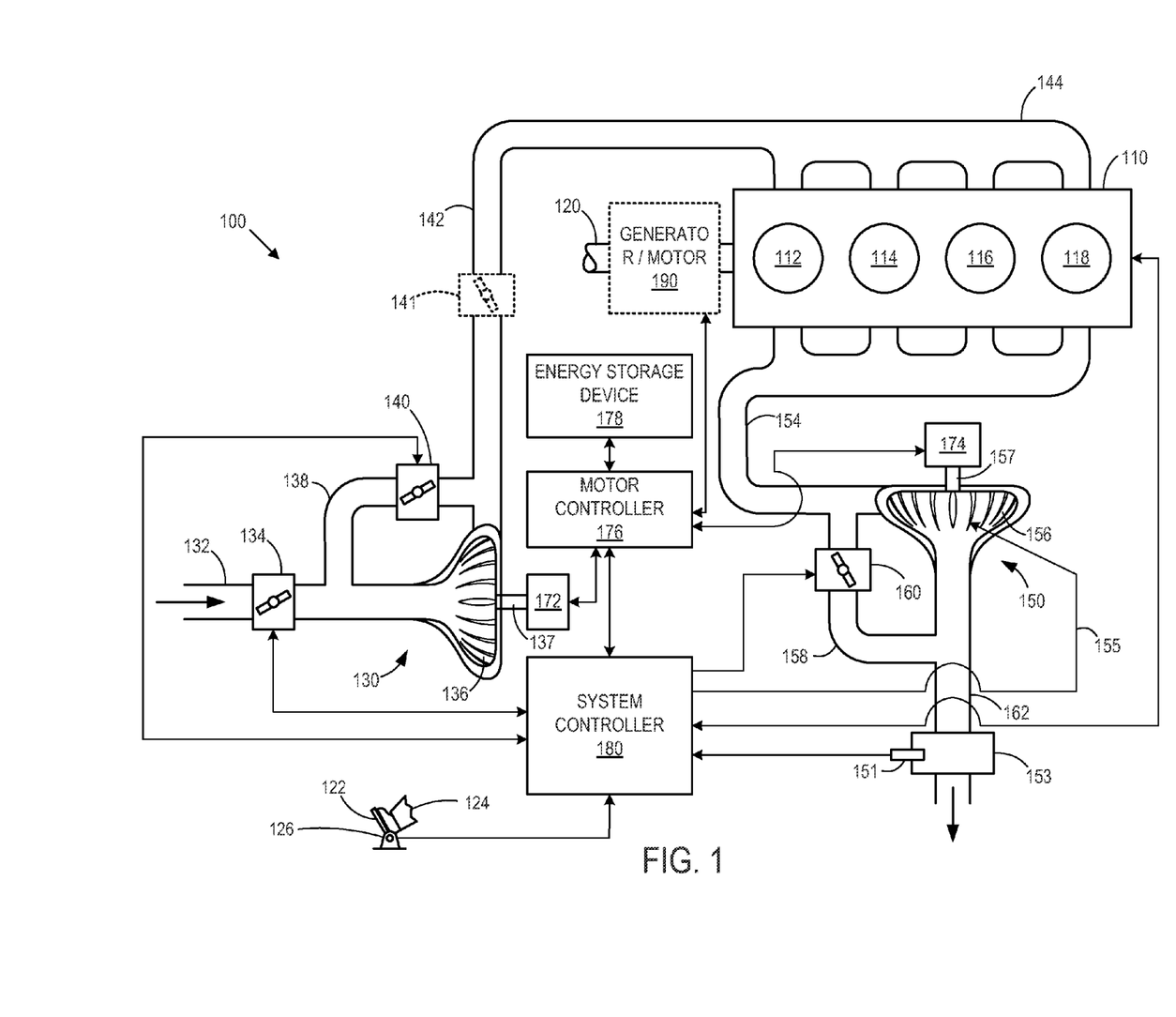
FIG. 1 shows a schematic depiction of an example vehicle propulsion system.

FIG. 1 shows a schematic depiction of an example vehicle propulsion system 100. Propulsion system 100 includes an internal combustion engine 110 having a plurality of combustion chambers or cylinders indicated at 112, 114, 116, and 118. A more detailed description an example engine cylinder is provided with reference to FIG. 2. While this particular example shows engine 110 including four cylinders, it should be appreciated that in other examples engine 110 may include any suitable number of cylinders.

Engine 110 can receive intake air via an intake system indicated generally at 130 and can exhaust combustion gases via an exhaust system indicated generally at 150. Intake system 130 can include an air intake passage 132 that includes a throttle 134. The position of throttle 134 can be adjusted by controller 180 to vary the flow rate of intake air provided to engine 110 as well as the pressure within the intake system downstream of the throttle. Intake passage 132 can communicate with a compression device such as compressor 136. A compressor bypass passage 138 may be provided to enable intake air to bypass compressor 136. A bypass valve 140 can be arranged along compressor bypass passage 138. The position of bypass valve 140 can be adjusted to vary the proportion of intake air that is directed through compressor 136. In some examples, bypass passage 138 and valve 140 may be omitted.

The outlets of compressor 136 and bypass passage 138 can be combined at an intake passage 142. In some examples, a throttle 141 may be arranged along intake passage 142, whereby throttle 134 may be omitted. Thus, a throttle can be arranged upstream and/or downstream of compressor 136.

Figure 2:
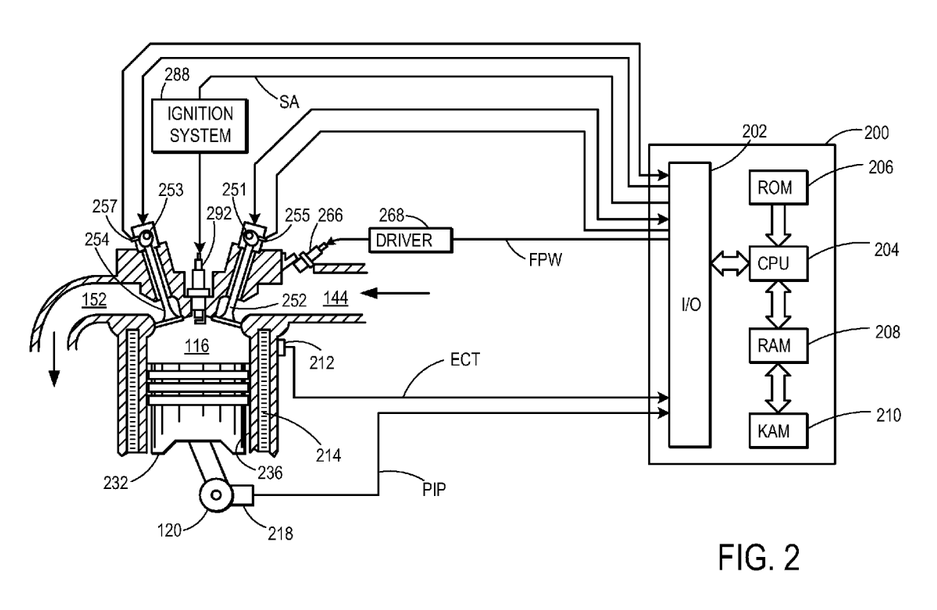
FIG. 2 shows a schematic depiction of an example cylinder of the propulsion system of FIG. 1.

However, in other examples, the intake system may not include a throttle. Intake passage 142 can provide intake air to intake manifold 144, which selectively and independently communicates with each of cylinders 112-118 via their respective intake valves, an example of which is shown in FIG. 2.

An exhaust manifold 152 can be provided to receive products of combustion from each of cylinders 112-118. Thus, each of cylinders 112-118 can selectively and independently communicate with exhaust manifold 152 via their respective exhaust valves, an example of which is shown in FIG. 2. Exhaust manifold 152 can provide exhaust gases produced by the various cylinders of the engine to exhaust passage 154. Exhaust passage 154 can communicate with an exhaust gas turbine 156. A turbine bypass passage 158 may be provided to enable exhaust gases to bypass turbine 156. A bypass valve 160 (e.g. a wastegate) can be arranged along turbine bypass passage 158. The position of bypass valve 160 can be varied to adjust the proportion of the exhaust gases that are directed through turbine 156. In some examples, bypass passage 158 and valve 160 may be omitted. The outlets of turbine 156 and bypass passage 158 can be combined at an exhaust passage 162.

Exhaust passage 162 can include an exhaust treatment device 153. Exhaust treatment device 153 can include one or more exhaust catalysts, traps, filters, or other suitable exhaust treatment components. Exhaust passage 162 can also include a sensor 151 for providing a temperature indication to controller 180 of the exhaust system temperature including the temperature of exhaust gases flow through exhaust passage 162 and/or the temperature of exhaust treatment device 153. For example, as shown in FIG. 1, sensor 151 may be coupled directly to device 153. However, in other examples, sensor 151 can be arranged partially within the exhaust flow of exhaust passage 162 upstream or downstream of device 153.

Engine 110 can include an output shaft or crankshaft 120. Crankshaft 120 can be coupled to one or more vehicle drive wheels via an intermediate transmission. In the case where propulsion system 100 is configured as a hybrid propulsion system, crank shaft 120 can also be coupled with a generator/motor 190, hereafter referred to simply as a motor. Motor 190 can include an electric motor as one example. Thus, propulsion system 100 can be configured as a hybrid electric vehicle (HEV). Motor 190 can be selectively operated as a motor or a generator. For example, motor 190 can provide work to crank shaft 120 and/or the vehicle drive wheels during some conditions and can absorb work from crank shaft 120 and/or the drive wheels of the vehicle during other conditions, such as during a regenerative braking operation.

Compressor 136 is shown fixedly coupled to a motor 172 via shaft 137. As one example, motor 172 can include an electric motor. The speed, torque, and/or direction of rotation of compressor 136 can be adjusted by varying the amount of electrical power that is provided to or extracted from motor 172. Thus, motor 172 can be operated to cause compressor 136 to provide boost to the engine or can be operated as a generator, whereby the compressor can remove energy from the intake air flow to generate electrical energy.

Turbine 156 is shown fixedly coupled to a motor 174 via shaft 157. As one example, motor 174 can include an electric motor. The speed, torque, and/or direction of rotation of turbine 156 can be adjusted by varying the amount of electrical power that is provided to or extracted from motor 174. As one example, motor 174 can be operated to cause turbine 156 to remove energy from the flow of the exhaust gases or can be operated to add energy to the exhaust gas flow. When the turbine is operated to remove energy from the exhaust flow, motor 174 can be operated as a generator. Additionally, the level of exhaust backpressure provided at the engine can be increased or decreased by varying the operation of the turbine. For example, exhaust backpressure can be increased by increasing the amount of energy extracted from the exhaust gas flow by the turbine and exhaust backpressure can be reduced by decreasing the amount of energy extracted from the exhaust flow.

While operation of motor 174 can be adjusted to vary the backpressure provided by the turbine, the geometry of the turbine can also be adjusted where it is configured as a variable geometry turbine (VGT). As one example, the system controller can issue a command signal indicated at 155 to a variable geometry actuator configured to adjust the turbine geometry, thereby enable further control over the amount of energy extracted from the exhaust flow and hence the level of exhaust backpressure attributed to the turbine.

Since compressor 136 is rotationally coupled with motor 172 via shaft 137 and turbine 156 can be rotationally coupled with a second motor 174 via shaft 157, the compressor and turbine need not rotate about the same axis of rotation. Thus, unlike turbochargers having a compressor and turbine that are rotationally coupled with each other, the configuration shown in FIG. 1 enables the compressor and turbine to be packaged with the engine in alternative configurations. For example, the axes of rotation of compressor 136 and turbine 156 need not be parallel and can have various engine system components arranged physically and spatially between them, thereby reducing engine packaging restraints for propulsion systems that are mounted on a mobile vehicle. However, it should be appreciated that compressor 136 and turbine 156 can be arranged in some examples so that their axes of rotation are parallel to each other or are collinear. Furthermore, as shown in FIG. 1, compressor 136 can be configured so that it is not rotationally coupled to any other exhaust turbine of the system and turbine 156 can be configured so that it is not rotationally coupled to any other compressor of the system. Further still, FIG. 1 shows how engine 110 can receive intake air via only a single compressor and can exhaust products of combustion via only a single turbine. However, in other examples, two or more compressors may be arranged in series or parallel along intake system 130 having only a single branch or multiple branches; and two or more turbines may be arranged in series or parallel along exhaust system 150 having only a single branch or multiple branches.

Operation of motors 172 and 174 can be controlled by a motor controller 176. Motor 172, which can include an electric machine, can receive electrical energy from an energy storage device 178 during a motor operation and can supply electrical energy to energy storage device 178 during a generator operation as directed by motor controller 176. Similarly, motor 174, which can include an electric machine, can receive electrical energy from energy storage device 178 during a motor operation and can supply electrical energy to energy storage device 178 during a generator operation as directed by motor controller 176. Furthermore, motor 174 can supply electrical energy to motor 172 via motor controller 176 and likewise motor 172 can supply electrical energy to motor 174. Energy storage device 178 may include one or more batteries and/or capacitors for storing electrical energy.

Figure 3:
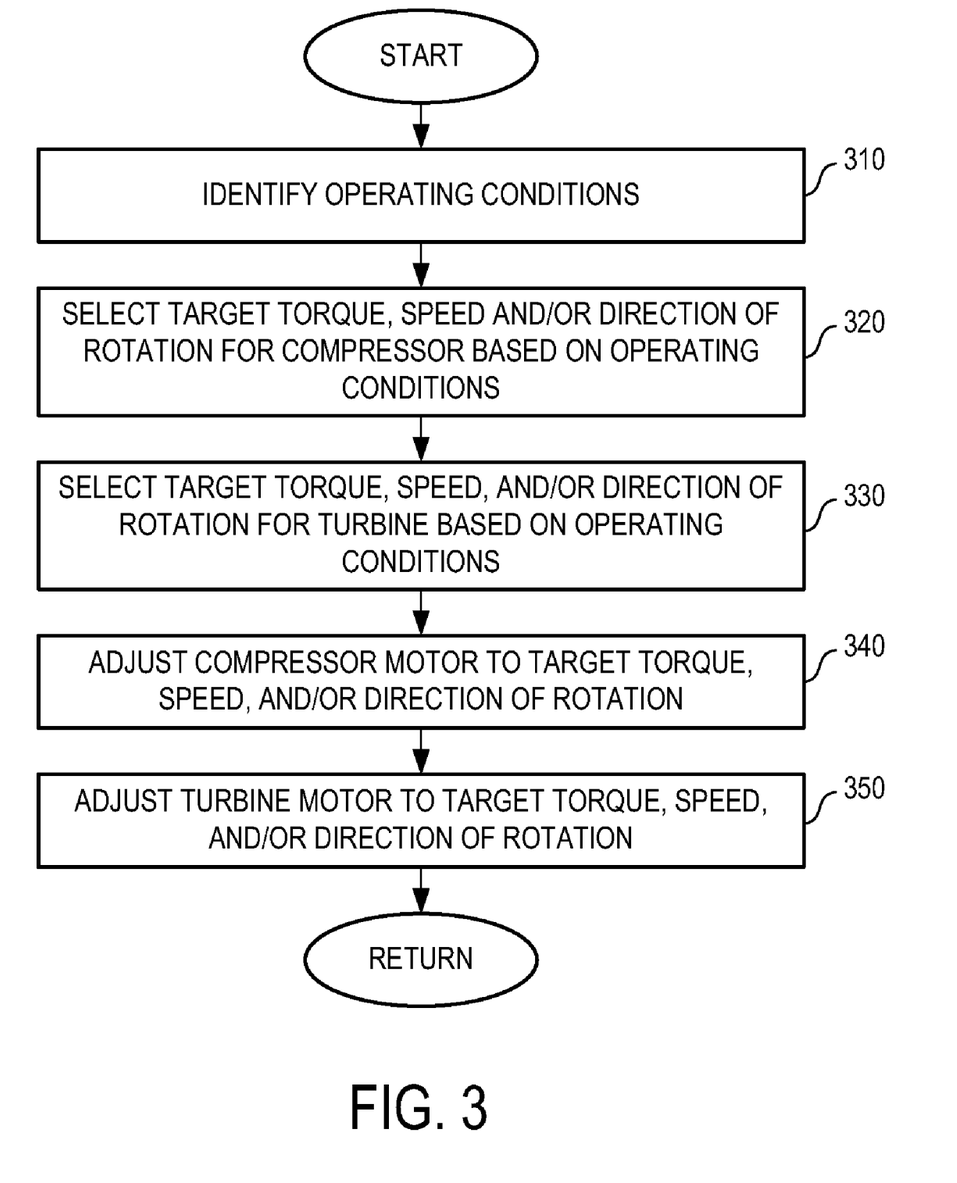
FIG. 3 shows a flow chart depicting an example control strategy for adjusting operation of the compressor and turbine in response to operating conditions.

The level of boost provided by compressor 136 and the level of exhaust backpressure provided by the turbine can also be adjusted by varying the position of bypass valves 140 and 160, respectively. For example, the level of boost can be reduced for a given operating state of the compressor by opening valve 140 to increase the airflow through bypass passage 138. Similarly, the level of exhaust backpressure can be reduced for a given operating state of the turbine by opening valve 160 to increase the exhaust flow through bypass passage 158. In some examples, such at lower engine speed or engine load, controller 180 can increase the opening of bypass valve 140 to reduce the flow of intake air through compressor 136 to thereby reduce the resistance of the intake system when compressor 136 is not being operated. For example, during an idle condition, the amount electrical energy delivered to motor 172 of compressor 136 can be reduced or eliminated and valve 140 can be opened, while during a higher speed or load condition, valve 140 can be closed and electrical energy can be provided to motor 172 to operate compressor 136 to provide increased boost pressure to engine 110.

Where motor 190 is included with propulsion system 100, motor controller 176 can adjust the amount of electrical energy generated by motor 190 and can vary the amount of electrical energy that is provided to energy storage device 178 and/or used by either of motors 172 and 174. Similarly, motor controller 176 can adjust the amount of electrical energy generated by motors 172 and/or 174 and can vary the amount of electrical energy that is provided to energy storage device 178 and/or motor 190. FIG. 3 provides a schematic depiction of the various energy management modes that may be performed by the motor controller.

Motor controller 176 can be controlled by a system controller 180. The combination of controllers 176 and 180 comprise a control system as described herein and shown in greater detail in FIG. 2. Note that in some examples controllers 176 and 180 can be combined as a single controller.

Controller 180 can receive an indication of an operator request via a user input device. For example, the position of an accelerator pedal 122 as varied by vehicle operator 124 can be identified by pedal position sensor 126. In this way, the control system can identify a user requested torque, speed, or load of the engine.

FIG. 2 shows a schematic depiction of an example cylinder of engine 110 controlled by a control system 200. For example, FIG. 2 shows cylinder 116 of FIG. 1 in greater detail. Note that the other cylinders of the engine can include a similar configuration as cylinder 116. Cylinder 116 is defined by cylinder walls 236 and piston 232 moveably positioned therein. Piston 232 is shown coupled to crankshaft 120. Intake air and/or fuel can be admitted to cylinder 116 from intake manifold 144 via intake valve 252 and products of combustion can be exhausted from cylinder 116 via exhaust valve 254. Note that in some examples, each cylinder of engine 110 including cylinder 116 can include two or more intake valves and/or two or more exhaust valves.

Intake valve 252 can be controlled by valve actuator 251. In this particular example, valve actuator 251 is configured as a cam actuator, whereby valve timing can be adjusted by way varying the position of the cam and/or cam shaft relative to the position of the crankshaft and/or by utilizing cam profile switching whereby a second cam is selectively used to provide alternative valve timing. However, in other examples, an electromagnetic valve actuator may be used instead of a cam actuator. Regardless of the particular intake valve hardware, the opening and closing timing of the intake valve can be adjusted by system controller 180. Sensor 255 can provide an indication of intake valve position to controller 180.

Exhaust valve 254 can be controlled by valve actuator 253. In this particular example, valve actuator 253 is configured as a cam actuator. However, in other examples, an electromagnetic valve actuator may be used instead of a cam actuator. Regardless of the particular intake valve hardware, the opening and closing timing of the exhaust valve can be adjusted by control system 200. Sensor 257 can provide an indication of intake valve position to control system 200. Exhaust gases can be exhausted from cylinder 116 to exhaust manifold 152 via exhaust valve 254.

Fuel can be provided to cylinder 116 via a fuel injector 266. In this particular example, fuel injector 266 is configured as a port injector. However, in other examples, fuel injector 266 may be configured as an in-cylinder injector to provide what may be referred to as direct injection. Fuel injector 266 can receive an injection command signal from driver 268 in response to a prescribed fuel injection timing provided by control system 200. Fuel injector 266 can receive fuel from a fuel system (not shown) including a fuel tank, a fuel rail, and a fuel pump.

An ignition device such as spark plug 292 may be configured to provide an ignition spark to the cylinder as direct by ignition system 288. Control system 200 can adjust the ignition timing provided by way of ignition system 288.

Control system 200 is provided as a representation of controllers 176 and 180 previously described with reference to FIG. 1. Therefore, it should be appreciated that control system 200 can include a single controller or multiple distinct controllers. Regardless of the particular configuration, control system 200 can include an input/output interface 202 for communicating with various sensors and actuators of the propulsion system, a central processing unit (CPU) 204, read-only memory (ROM) 206, random access memory (RAM) 208 and/or keep-alive memory (KAM) 210, each of which can communicate via a data bus. Central processing unit 204 can execute instructions stored in memory to carry out the various control methods and routines described herein. In addition to the previously described sensors and actuators, control system 200 can receive an indication of the temperature of the engine at coolant sleeve 214 via sensor 212 and can receive an indication of crankshaft position and/or engine speed via a profile ignition pickup signal (PIP) from Hall effect sensor 218 or other suitable sensor communicating with crankshaft 120.

While not shown in FIGS. 1 and 2, intake system 130 and exhaust system 150 can include various temperature and/or pressure indicating sensors that are arranged in communication with the control system. For example, intake system 130 may include temperature and/or pressure indicating sensors arranged along intake passage 132 upstream of the compressor as well as temperature and/or pressure indicating sensors arranged along intake passage 142 or within intake manifold 144 located downstream of the compressor. Exhaust system 150 may include temperature and/or pressure indicating sensors arranged upstream of turbine 156 within exhaust manifold 152 or exhaust passage 154 as well as temperature and/or pressure indicating sensors arranged along exhaust passage 162 located downstream of turbine 156. These indications of temperature and/or pressure within the intake and exhaust systems can be used by the control system to identify the level of boost provided by the compressor and the level of exhaust backpressure created by the turbine, as well as enabling the control system to infer the speed, torque, and direction of rotation of the compressor and turbine, for purposes of feedback control.

FIG. 3 shows a flow chart depicting an example control strategy for adjusting the operation of the compressor and turbine in response to operating conditions of the vehicle propulsion system. At 310, operating conditions of the propulsion system can be identified. For example, the control system can obtain operating condition information from the various sensors previously described as well as other suitable sensors for providing an indication of the various operating conditions described below. Operating conditions may include one or more of the following: engine speed, engine torque, engine load, the combustion mode performed by the engine cylinders, ambient conditions including ambient air temperature and pressure, intake manifold pressure (e.g. boost pressure), exhaust manifold pressure (e.g. exhaust backpressure), exhaust gas temperature, engine temperature, throttle position, intake and exhaust valve timings and opening overlap, compressor bypass valve position, turbine bypass valve position, intake and exhaust air flow rates, accelerator pedal position, operating state of the compressor and associated motor including an indication of the speed, torque and direction of rotation, operating state of the turbine and associated motor including an indication of speed, torque and direction of rotation, the geometry of the turbine where it is configured as a variable geometry turbine, the operating states of motor 190 and a state of charge of energy storage device 178, among other suitable conditions.

At 320, a target torque, speed, and/or direction of rotation can be selected for the compressor based on the operating conditions identified at 310. At 330, a target torque, speed, and/or direction of rotation can be selected for the turbine based on the operating conditions identified at 310. For example, the control system can reference a map, look-up table or function stored in memory in response to the identified operating conditions to select the target torque, speed, and/or direction of rotation for the compressor and turbine. Note that the operating parameters of the compressor and turbine can be selected in response to the same or different operating conditions.

Figure 7:
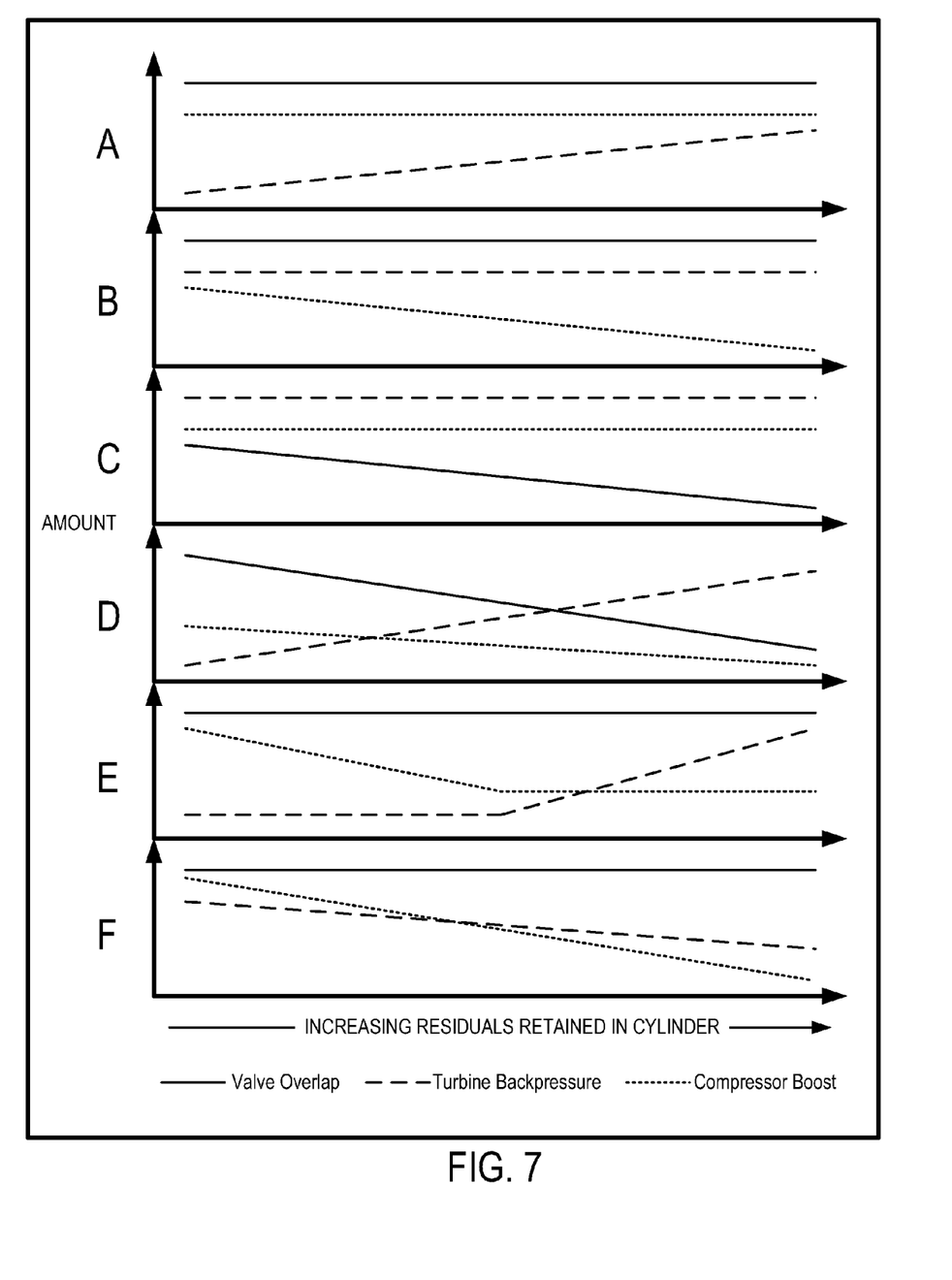
FIGS. 7A-7F show graphs depicting example control strategy implementations.

As one non-limiting example, the speed and torque at which the compressor is operated can be coordinated with the speed and torque at which the turbine is operated to control the amount of residuals that are retained in the engine cylinders. For example, as the amount of energy extracted from the exhaust flow by the turbine is increased (e.g. by increasing negative torque and speed of the turbine), the exhaust backpressure provided by the turbine may be increased. By increasing the exhaust backpressure, the amount of residuals retained in the cylinder from the previous combustion event may be increased, for a given valve overlap, as shown in FIG. 7A for example. By instead reducing the amount of exhaust flow energy that is extracted by the turbine (e.g. by reducing negative torque or providing positive torque to the exhaust flow), the exhaust backpressure may be reduced, thereby reducing the amount of residuals retained by the cylinder for the given valve overlap.

As another example, as the level of boost provided by the compressor is increased (e.g. by increasing positive compressor torque and/or speed) for a given valve overlap, the amount of residuals retained in the cylinder may be reduced, as shown in FIG. 7B for example. Conversely, the amount of residuals retained in the cylinder may be increased for the given valve overlap by reducing the level of boost provided by the compressor (e.g. by reducing the positive torque and/or speed of the compressor).

Further still, the valve overlap can be adjusted for a given set of compressor and turbine operating parameters as shown in FIG. 7C. For example, the amount of residuals retained by the cylinder may be increased by reducing valve overlap and/or by adjusting the relative timing of exhaust valve opening and closing relative to piston position. Conversely, the amount of residuals retained by the cylinder may be reduced by increasing the valve overlap and/or by adjust the relative timing of the exhaust valve opening and closing relative to piston position.

Since the compressor and turbine are not mechanically coupled with each other and are instead able to be driven independently of each other via their respective motors, the retention of residuals within the engine cylinders can be more effectively controlled. For example, the compressor speed and torque can be adjusted relative to the turbine speed, torque and direction of rotation, thereby enabling a control response where only one of the devices responds to a requested increase or decrease in the amount of residuals retained by the cylinder; or the control system can respond to a request for more or less residual retention by adjusting the compressor and turbine at different rates, consonant with their respective response time and hardware limitations.

At 340, operation of the compressor motor can be adjusted to achieve the target torque, speed, and/or direction of rotation that was selected at 320. Similarly, at 350, operation of the turbine can be adjusted to achieve the target torque, speed, and/or direction of rotation that was selected at 330. Next, the routine may return where feedback or feedforward control may be used to control the turbine and compressor operations in response to changing operating conditions.

Figure 4A:
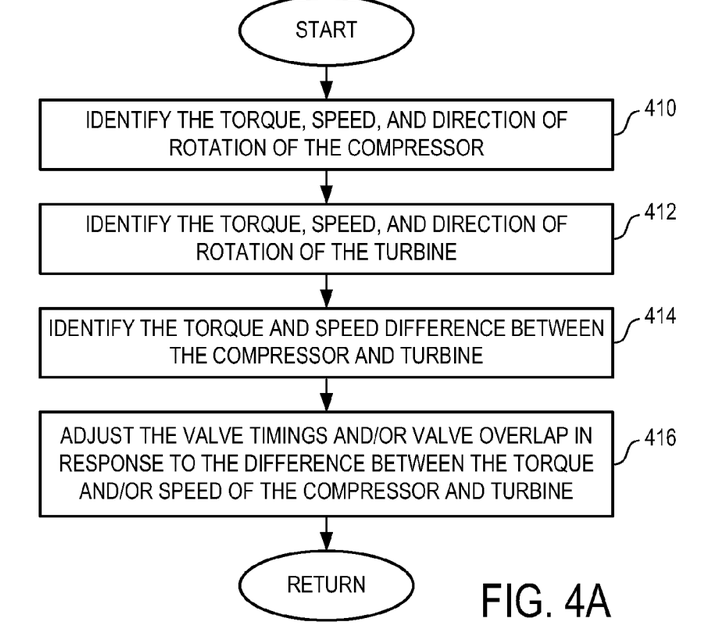
FIGS. 4A and 4B show flow charts depicting example control strategies for coordinating valve timing and overlap with operation of the compressor and turbine.

FIG. 4A is a flow chart depicting an example of how the valve timings or valve overlap may be adjusted in response to compressor and/or turbine operations. At 410 and 412, the torque, speed, and/or direction of rotation can identified for the compressor and the turbine, respectively. For example, the control system can obtain an indication of compressor speed, torque, and/or direction of rotation from motor 172 and an indication of turbine speed, torque, and/or direction of rotation from motor 174. In other examples, shafts 137 and 157 may include speed or torque sensors for providing an indication of compressor and turbine speeds and torques to the control system. In still other examples, the speed, torque, and/or direction of rotation of the compressor and/or turbine may be inferred from airflow sensors arranged within the intake or exhaust systems.

At 414, a torque or speed difference between the compressor and turbine may be identified at 414. For example, the control system can compare the indication of compressor speed or torque to the speed and torque of the turbine. At 416, the valve timings and/or valve opening overlap can be adjusted in response to the difference between the torque and/or speed of the compressor and turbine as identified at 414. Additionally or alternatively, the opening overlap can be adjusted in response to a rotational speed of the engine. For example, the opening overlap of the intake and exhaust valves can be increased with increasing engine speed for a given compressor operating state.

As one non-limiting example, the control system can increase the amount of overlap between the exhaust valve closing timing and the intake valve opening timing with decreasing compressor torque and/or speed; or the amount of overlap may be reduced as the compressor torque and/or speed are increased. This approach may be used, for example, to maintain a prescribed level of residuals within the engine cylinders while adjusting the level of boost that is provided to the engine by the compressor. However, in other examples, the amount of overlap between the intake and exhaust valve timing may be increased with increasing boost provided by the compressor or may be reduced with decreasing boost. As described with reference to FIGS. 5 and 6, the amount of residuals that are retained in the cylinder can be varied with respect to the type of combustion mode carried out by the cylinder.

Figure 4B:
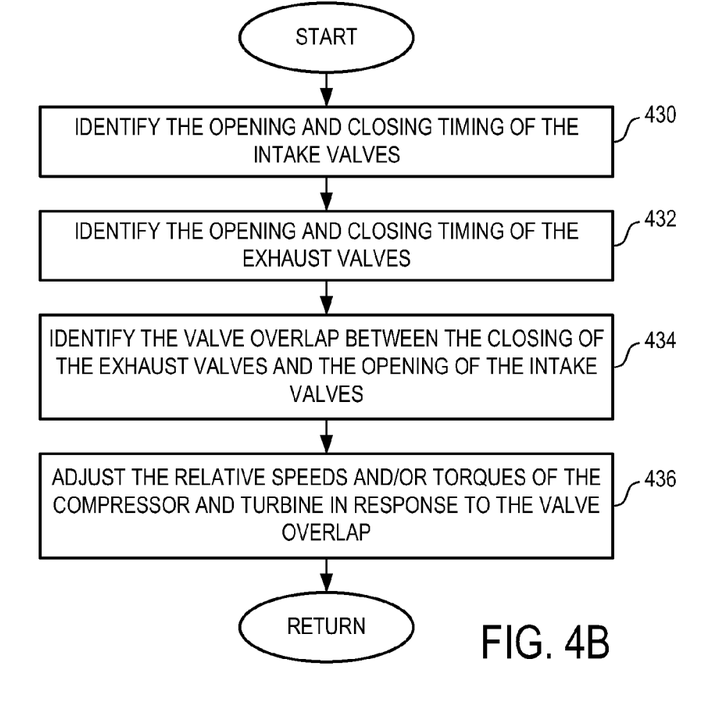

FIG. 4B is a flow chart depicting an example of how the compressor and/or turbine may be instead adjusted in response to valve timing and/or valve overlap. At 430, the opening and closing timing of the intake valves can be identified. For example, the control system can identify the position and hence the timing of the intake valve opening and closing from sensor 255. At 432, the opening and closing timing of the exhaust valve can be identified. For example, the control system can identify the position and hence the timing of the exhaust valve opening and closing from sensor 257.

At 434, the valve overlap between the closing of the exhaust valve and the opening of the intake valve can be identified, for example, by comparing the valve timings identified at 430 and 432. At 436, the relative speeds and/or torques of the compressor and turbine can be adjusted in response to the valve overlap identified at 434. For example, the control system can increase or decrease the speed and/or torque of the compressor relative to the turbine; or the control system can increase or decrease the speed and/or torque of the turbine relative to the compressor. Note that the speed and torque of the turbine or compressor can be controlled independently such that the speed may be increased while the torque is reduced and/or vice versa.

In this way, the operation of the turbine and/or compressor can be adjusted in response to valve timing or valve overlap. Thus, where a prescribed level of combustion residuals are to be retained within the cylinder, the valve timing and boost can be coordinated. For example, the control system can increase the relative speed and/or torque difference between the compressor and turbine with increasing or decreasing valve overlap to retain the prescribed amount of residuals within the cylinder. As described with reference to FIGS. 5 and 6, the level of residuals to be retained by the cylinder can be dictated by the combustion mode of the cylinder.

Figure 5:
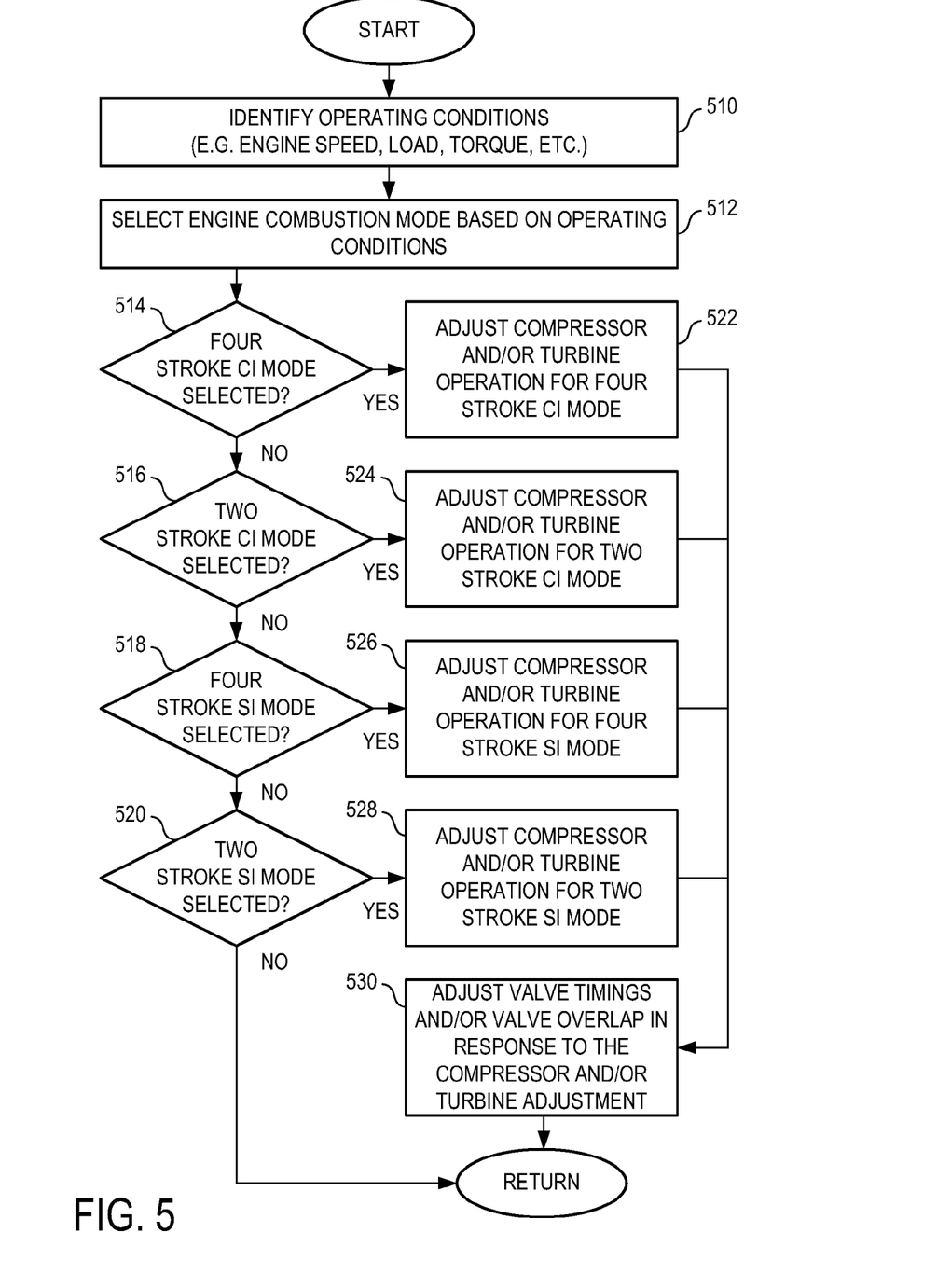
FIG. 5 shows a flow chart depicting an example control strategy for adjusting operation of the compressor and turbine in response to combustion mode of the engine.

FIG. 5 is a flow chart depicting an example control strategy for adjusting compressor and/or turbine operation in response to the combustion mode of the cylinder. At 510, the operating conditions of the propulsion system can be identified. The operating conditions identified at 510 can be the same as those previously described at 310. For example, the control system can identify current and/or target engine speed, engine torque, and/or engine load conditions.

At 512, in response to the operating conditions identified at 512, a combustion mode can be selected. Note that combustion mode can be selected on an individual cylinder basis or can be selected for the engine as a whole. As one example, the control system can reference a combustion mode map or look-up table stored in memory for the given operating conditions to enable selection of at least one combustion mode to be carried out by the cylinder. For example, at higher engine loads or engine speeds, a first combustion mode may be selected, whereas at lower engine loads or engine speeds, a second combustion mode may be selected.

In this particular example, one of several combustion modes may be selected by the control system as judged at 514, 516, 518, and 520. However, in other examples, a fewer number or greater number of combustion modes may be available for selection. Further still, in some examples, the combustion mode or number of available combustion mode may be selectable the vehicle operator via a user selectable combustion mode switch.

If, at 514, a four stroke compression ignition (CI) mode is to be performed by the cylinder, then the routine can proceed to 522, whereby the compressor and/or turbine operation can be adjusted for the four stroke compression ignition mode and compression ignition of an air and fuel charge can be performed by the cylinder once every 720 crank angle degrees.

As one non-limiting example, the CI mode, whether four stroke or two stroke, may include what may be referred to as homogeneous charge compression ignition (HCCI), whereby the air and fuel charge is auto-ignited by compression performed by the piston. In contrast to diesel type compression ignition where an injection of fuel is utilized to initiate combustion, auto-ignition of the charge by HCCI can be induced by adjusting the temperature and pressure within the cylinder to a level sufficient for self ignition at the prescribed ignition timing. Additionally, the fuel used during HCCI can include gasoline as opposed to diesel fuel. One approach for controlling the temperature and pressure within the cylinder and hence the auto-ignition timing is to vary the amount of residuals retained by the cylinder from the previous combustion cycle. During the CI mode and more particularly by way of HCCI, the speed and/or torque of the compressor (or turbine) can be adjusted to target speed and torque setpoints for a given set of operating conditions. In this way, a target or prescribed amount of residuals can be retained in the cylinder for facilitating the four stroke CI mode.

If, at 516, a two stroke compression ignition mode is to be performed by the cylinder, then the routine can proceed to 524, whereby the compressor and/or turbine operation can be adjusted for the two stroke compression ignition mode and compression ignition of an air and fuel charge can be performed by the cylinder once every 360 crank angle degrees. As one example, the compressor may be operated to provide increased levels of boost during the two stroke mode in order to respond to increased residual retention that may occur during the two stroke mode relative to the four stroke mode, since valve overlap events can be shorter during the two stroke operation. In this way, a target or prescribed amount of residuals can be retained in the cylinder even when the cylinder can operate in a four stroke mode during some conditions and a two stroke mode during other conditions.

If, at 518, a four stroke spark ignition (SI) mode is to be performed by the cylinder, then the routine can proceed to 526, whereby the compressor and/or turbine operation can be adjusted for the four stroke spark ignition mode, where the air and fuel charge can be ignited within the cylinder by the spark plug at a frequency of once every 720 crank angle degrees. Note that the target amount of residuals to be retained by cylinder may be less during the SI modes than the CI modes, since ignition of the air and fuel charge is initiated by an ignition spark rather than by compression performed by the cylinder.

If, at 520, a two stroke spark ignition mode is to be performed by the cylinder, then the routine can proceed to 528, whereby the compressor and/or turbine operation can be adjusted for the two stroke compression ignition mode and compression ignition of an air and fuel charge can be performed by the cylinder once every 360 crank angle degrees. In some examples, the level of boost provided by the compressor can be greater during two stroke SI than during four stroke SI in order to reduce the level of residuals retained by the cylinder, which may be due to the shorter valve overlap in the two stroke mode.

At 530, the valve timings and/or valve overlap of the cylinder can be adjusted in response to the selected combustion mode and can be adjusted in response to the compressor and/or turbine adjustment performed at one of operations 522, 524, 526, and 528 as previously described with reference to operation 416 of FIG. 4A. Thus, adjustment of the valve timings and overlap can be coordinated with turbine and compressor operations to retain a residual amount appropriate for the selected combustion mode.

While various combustion modes have been described with reference to FIG. 5, including a homogeneous charge compression ignition mode, a spark ignition mode, two stroke mode, and a four stroke mode, still other combustion modes may be carried out by the engine cylinders. For example, some spark ignition modes may carry out combustion during a first condition by igniting a stratified charge and during another condition by igniting a homogeneous charge. Similarly, compression ignition modes may utilize ignition of a homogeneous charge during a first condition and stratified charge ignition during a second condition. Where a stratified charge is to be generated within the cylinder, a first earlier fuel injection can be performed by the injector to create a more homogeneous mixture in the combustion chamber followed by a second later fuel injection that creates a rich region of fuel in the vicinity of the ignition source, such as a spark plug, for example.

Regardless of the various combustion modes employed by the engine, the compressor and turbine can be operated at independently selectable speed and torque setpoints for a given set of operating conditions. For example, during a first combustion mode, the turbine and compressor can be operated with a first speed and/or torque difference for a given set of operating conditions. During a second combustion mode, the turbine and compressor can be operated with a second speed and/or torque difference for the given set of operating conditions. In this way, a level of boost that is suitable for each combustion mode can be provided by the compressor, while the turbine can be operated to vary the retention of residuals suitable for the particular combustion mode of the engine cylinders.

As a non-limiting example scenario, the control system can operate the engine so that during a first operating condition, the engine is operated in a first combustion mode while adjusting the compressor to provide a higher level of boost to the engine and turbine is operated at a first speed difference relative to the compressor; and during a second operating condition, engine is operated in a second combustion mode while adjusting the compressor to provide a lower level of boost to the engine and the turbine is operated at a second speed difference relative to the compressor. The first operating condition can include a different engine speed or engine load than the second operating condition, for example. In this way, a boost pressure suitable for a given combustion mode of the engine may be provided while also retaining a level of exhaust gas residuals within the engine cylinders by controlling the relative speeds of the compressor and turbine.

Figure 6:
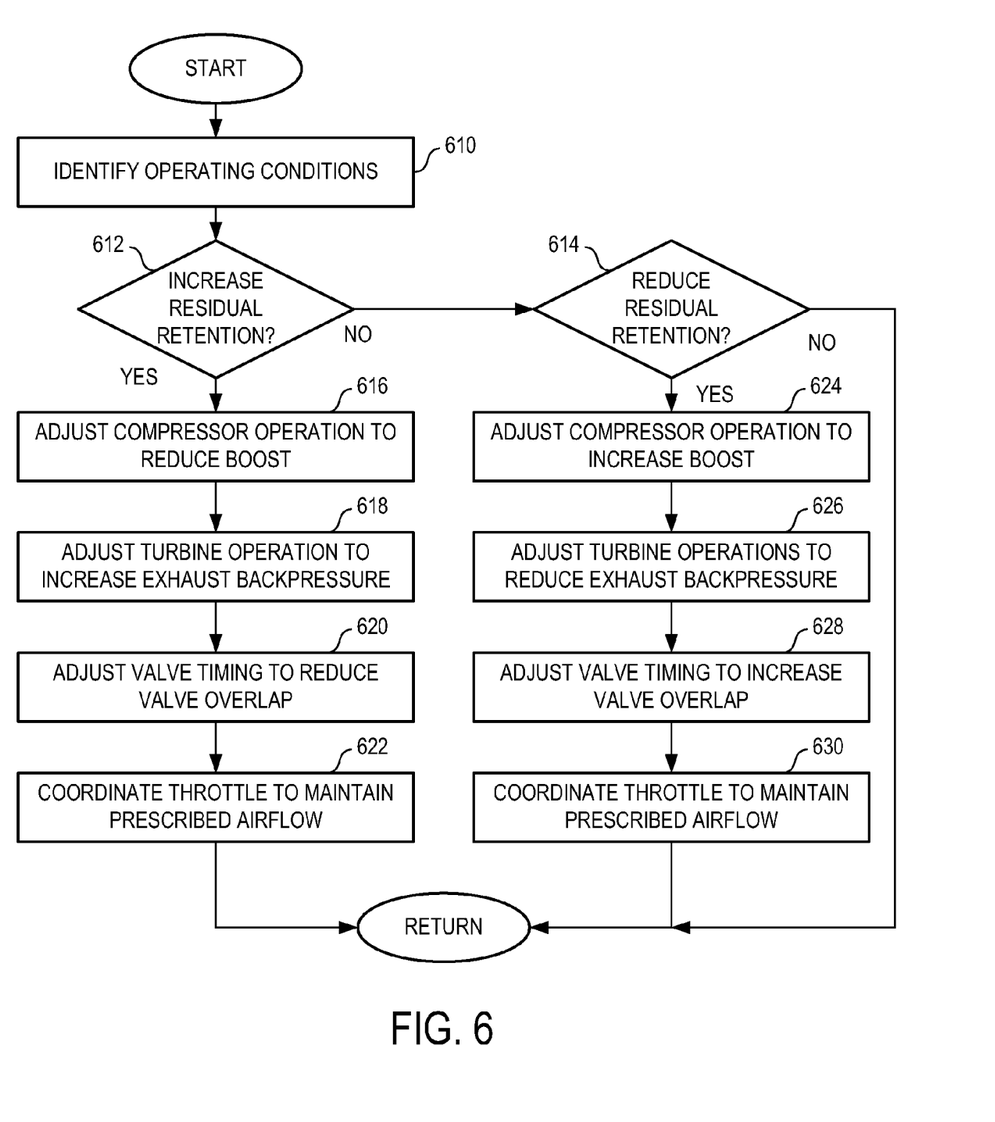
FIG. 6 shows a flow chart depicting an example control strategy for adjusting the amount of exhaust residuals that are retained in a cylinder of the engine.

FIG. 6 shows a flow chart depicting an example control strategy for adjusting the amount of exhaust residuals that are retained in a cylinder of the engine. At 610, the control system can identify operating conditions of the vehicle propulsion system, for example, as previously described with reference to 310. For example, the control system may identify the present combustion mode of the cylinder or a prescribed combustion mode to which the cylinder is to be transitioned, among other operating conditions.

If at 612, the amount of residuals to be retained by the cylinder is to be increased, then one or more of the operations at 616-622 may be performed. Alternatively, if residual retention is not to be increased, then the routine may proceed to 614. For example, the control system may judge whether to increase or decrease residual retention based on the current operating conditions including the present combustion mode as well as operator input indicative of user requested torque. Where a change in operating conditions dictates a transition to a different combustion mode, the control system may judge at 612 that the amount of residuals retained by the cylinder is to be increased or alternatively reduced as will be described with reference to 614. Note that the control system can reference a look-up table, mode map, or other algorithm stored in memory to identify an appropriate amount of residuals to be retained based on operating conditions including engine load, engine speed, and engine torque requested by the operator for the given combustion mode.

In order to increase residual retention, the compressor operation may be adjusted to reduce the level of boost provided to the cylinder by the compressor. As one example, the control system may reduce the amount of electrical energy (e.g. electrical power) provided to the compressor motor to reduce compressor speed and/or torque, thereby reducing compressor boost. As another example, the compressor bypass valve may be opened to reduce the flow of intake air through the compressor, thereby reducing boost and increasing residual retention.

At 618, operation of the turbine may be adjusted to increase exhaust backpressure, thereby enabling an increase in the amount of residuals retained by the cylinder. For example, the control system can increase the amount of electrical energy that is produced by the turbine motor from the conversion of the kinetic and thermal energy of the exhaust flow into electrical energy, thereby increasing exhaust backpressure at the cylinder. As another example, the exhaust flow through the turbine bypass (if any) may be reduced by closing the turbine bypass valve. In this way, exhaust backpressure may be increased, thereby increasing residual retention.

At 620, the valve timing may be adjusted to reduce the valve overlap between the opening of the intake valves and the opening of the exhaust valves. By reducing the valve overlap, the amount of residuals retained in the cylinder may be increased. At 622, the throttle position can be coordinated with the various adjustments performed at one or more of operations 616, 618, and 620, to maintain the prescribed airflow to the engine. For example, where compressor boost is reduced, the throttle can be opened to a greater extent to maintain a target airflow rate to the cylinder. In this way, fluctuations in torque that may be caused by adjustment to the residual retention rate at the engine may be reduced, particularly where a reduction in compressor boost is performed to enable an increase in residual retention levels.

If it is instead judged at 614 to reduce the residual retention, then one or more of operations 624-630 may be performed. For example, at 624, the operation of the compressor may be adjusted to increase the level of boost provided to the engine. The control system may increase the amount of electrical energy that is provided to the compressor motor to increase the speed and/or torque of the compressor. By increasing compressor boost, the amount of residuals retained in the cylinder may be reduced, particularly where valve overlap is utilized.

At 626, the operation of the turbine may be adjusted to reduce exhaust backpressure at the engine. For example, the control system can extract less energy from the exhaust flow via the turbine, which can be converted to electrical energy by the turbine motor; or the turbine can provide energy to the exhaust flow. By reducing the extraction rate of energy from the exhaust flow or by providing energy to the exhaust flow, the backpressure at the engine may be reduced, thereby reducing residual retention at the cylinder.

At 628, the valve timing may be adjusted to increase valve overlap. The increase in valve overlap can increase the exchange of fresh intake air to the cylinder and can increase removal of exhaust gas residuals from the cylinder. Additionally, the throttle position can be adjusted in coordination with an adjustment made at one or more of operations 624, 626, and 628, to maintain a prescribed airflow to the engine. For example, the throttle can be further closed in response to an increase in boost provided by the compressor to reduce the additional mitigate the effects of the added airflow that would be provided to the engine. In this way, fluctuations in torque that may be caused by adjustment to the residual retention rate at the engine may be reduced, particularly where increased compressor boost is used to reduce residual levels.

FIGS. 7A-7F show graphs depicting example control strategy implementations. FIG. 7A shows an example depicting how the amount of residuals retained in a cylinder of the engine can be increased by adjusting operation of turbine to increase exhaust backpressure, while valve overlap and compressor boost can remain substantially unchanged. Conversely, the amount of residuals may be reduced by reducing the exhaust backpressure imparted by the turbine. The exhaust backpressure created by the turbine can be increased, for example, by extracting additional energy from the exhaust gas flow.

FIG. 7B shows an example depicting how the amount of residuals retained in the cylinder of the engine can be increased by adjusting operation of compressor to reduce the level of boost provided to the engine, while valve overlap and compressor boost can remain substantially unchanged. Conversely, the amount of residuals retained in the cylinder can be reduced by adjusting operation of compressor to increase the level of boost provided to the engine.

FIG. 7C shows an example depicting how the amount of residuals retained in the cylinder of the engine can be increased by reducing a valve overlap between an opened state of the intake and exhaust valves, while turbine and compressor operations can remain substantially unchanged. Conversely, the amount of residuals retained in the cylinder can be reduced by increasing the valve overlap.

FIG. 7D shows an example depicting how the amount of residuals retained in the cylinder may be adjusted by varying two or more operating parameters including the turbine and/or compressor operations, as well as the valve overlap as previously described with reference to FIGS. 7A-7C.

FIG. 7E shows an example depicting how the amount of residuals retained in the cylinder may be adjusted by first adjusting a first operating parameter and subsequently adjusting a second operating parameter. For example, FIG. 7E shows how compressor boost may be first reduced and turbine created backpressure may be subsequently increased to increase residual retention. Thus, different operating parameters such as turbocharger operation, compressor operation, and/or valve operation may be adjusted in a different order or concurrently depending on whether the residual retention is to be increased or decreased.

FIG. 7F shows an example depicting how the amount of residuals retained in the cylinder may be adjusted by varying two operating parameters at different rates. For example, FIG. 7F shows how the turbine operation may be adjusted to reduce backpressure to a lesser extent than a reduction in compressor boost, thereby causing an overall increase in the amount of residuals retained. Thus, one or more operating parameters can be adjusted in a direction that increases residual retention while one or more other operating parameters can be adjusted in a direction that reduces residual retention, whereby the overall change in the amount of residuals retained by the cylinder can be based on the relative rate of change of the these operating parameters.

Figure 8:
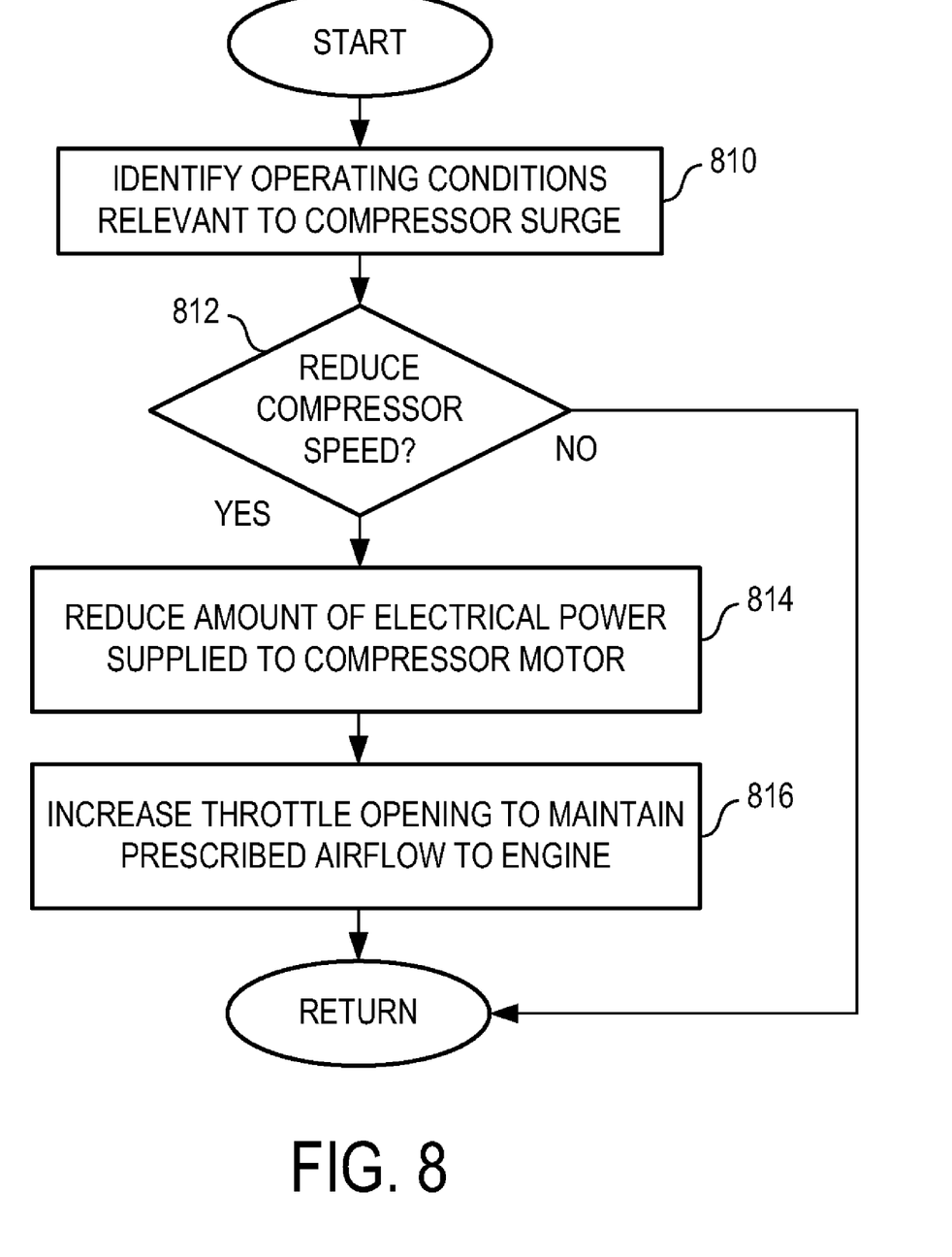
FIG. 8 shows a flow chart depicting an example control strategy for addressing compressor surge.

FIG. 8 shows a flow chart depicting an example control strategy for addressing compressor surge. At 810, the control system can identify operating conditions relevant to compressor surge. Of the various operating conditions described with reference to operation 310, the control system may utilize an indication of compressor speed and torque for a given volumetric flow rate of intake air through the compressor as well as the pressure ratio across the compressor. For example, the control system can reference a compressor surge map stored in memory to enable the control system to selectively operate the compressor within suitable ranges of operating conditions where compressor surge does not occur.

However, during some conditions, such as at lower engine speeds and/or lower volumetric intake airflow conditions, sufficiently high compressor speed may result in compressor surge. Compressor surge can be reduced by reducing compressor speed relative to the volumetric flow rate of intake air through the compressor. Therefore, at 812, it may be judged whether to reduce compressor speed. If the answer at 812 is yes, the routine may proceed to 814. If the answer at 812 is no, the routine may return.

At 814, the amount of electrical energy or power provided to the compressor motor can be reduced to reduce the compressor speed. In coordination with the reduction of compressor speed, the throttle opening can be increased to maintain the prescribed airflow to the engine as indicated at 816. The compressor bypass valve opening can also be increased to further reduce compressor surge.

Figure 9:
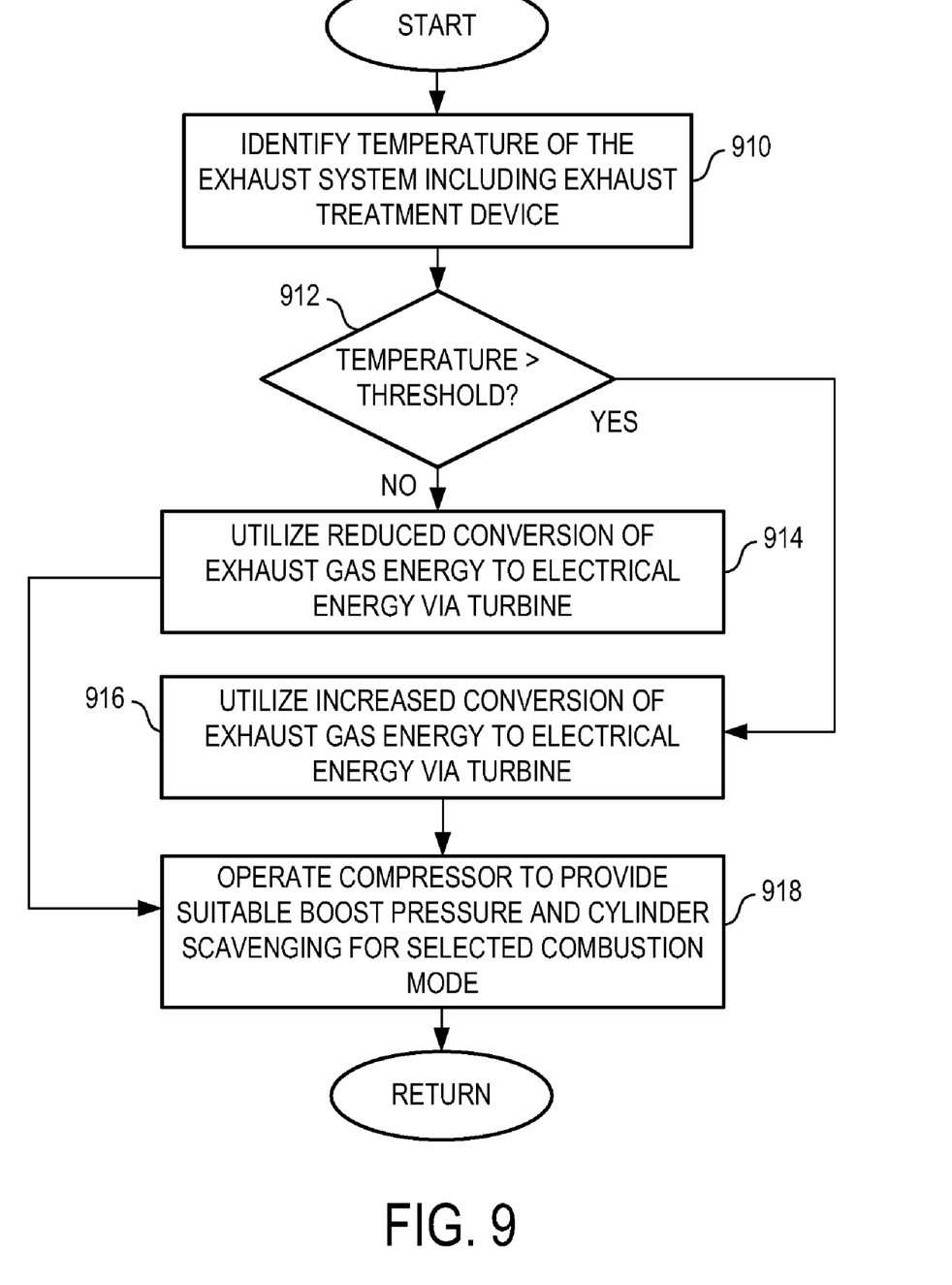
FIG. 9 shows a flow chart for controlling exhaust heating.

FIG. 9 shows a flow chart depicting an example approach for controlling compressor and turbine operation during different exhaust system temperature conditions. At 910, the temperature of the exhaust system including the temperature of an exhaust treatment device can be identified. At 912, if the temperature of the exhaust system and/or exhaust treatment device is greater than a threshold temperature, the routine can proceed to 916, where an increased conversion of exhaust gas energy to electrical energy can be performed by the turbine and associated motor. Alternatively, if at 912, the temperature of the exhaust system and/or exhaust treatment device is not greater than the threshold temperature, then the routine can proceed to 914 where a reduced conversion of exhaust gas energy to electrical energy can be used. For example, depending on the temperature condition of the exhaust system, the control system can adjust the geometry of the turbine, the flow rate of exhaust gas bypassing the turbine (e.g. via valve 160), and/or the torque load of motor 174 to vary the backpressure provide by the turbine as well as adjusting the amount of exhaust gas energy that is extracted from the exhaust flow. In this way, during a cooler exhaust temperature condition, such as during start-up of the engine or during a warm-up phase of the exhaust system, increased exhaust energy can be provided to the exhaust treatment device to promote more rapid heating. When sufficient heating of the exhaust treatment device has occurred, for example, when the temperature exceeds the threshold, the amount of exhaust energy extracted by the turbine may be increased, whereby the turbine motor can generate additional electrical energy.

At 918, the compressor can be operated to provide a suitable boost pressure and cylinder scavenging of exhaust residuals (e.g. responsive to valve overlap) for the selected combustion mode. For example, the compressor can be operated at different speed differences than the turbine during warmer and cooler conditions of the exhaust system in order to maintain an appropriate boost pressure at the engine and retain a prescribed level of residuals even when the turbine speed varies with exhaust system temperature.

As another non-limiting example scenario utilizing some of the previously described approaches, a vehicle propulsion system may comprise an internal combustion engine including at least one cylinder; an intake valve operable to selectively admit at least intake air to the cylinder; an exhaust valve operable to selectively exhaust products of combustion from the cylinder; an intake air compressor communicating with the cylinder via the intake valve; a first electric machine rotationally coupled with the compressor; an exhaust gas turbine communicating with the cylinder via the exhaust valve; a second electric machine rotationally coupled with the compressor; and a control system having memory containing executable instructions to: during an early stage of an acceleration event of the vehicle, provide an initial higher boost pressure to the engine via the compressor by adjusting a speed of the first electric machine relative to a speed of the second electric machine, and operate the intake and exhaust valves to provide an initially smaller amount of opening overlap between the intake valve and the exhaust valve; and during a later stage of the acceleration event of the vehicle, provide a subsequently lower boost pressure to the engine via the compressor by adjusting the speed of the first electric machine relative to the speed of the second electric machine, and operate the intake and exhaust valves to provide a subsequently larger amount of opening overlap between the intake valve and the exhaust valve. In this way, the control system can adjust the boost pressure provided to the engine during an acceleration event in order to meet the engine performance request of the vehicle operator, while also adjusting the valve overlap in response to the boost provided by the compressor to maintain a suitable level of exhaust gas residuals in the engine cylinders.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle propulsion system, comprising:
an internal combustion engine including at least one cylinder with an intake valve and an exhaust;
an intake air compressor communicating with the cylinder via an intake valve;
an electric machine rotationally coupled to a shaft of the compressor;
an exhaust gas turbine communicating with the cylinder via an exhaust valve; and
a control system configured to operate the compressor at a different speed than the turbine, at least under an operating condition, to adjust the electric machine responsive to conditions of compressor surge to reduce the surge while continuing to extract energy from an exhaust flow of the engine via the exhaust gas turbine, and to increase an amount of opening overlap between the intake valve and the exhaust valve in response to an increase in rotational speed of the compressor.

2. The system of claim 1, wherein the control system is configured to adjust the electric machine responsive to conditions of compressor surge by adjusting a rotational speed of the electric machine in response to a flow rate of intake air consumed by the engine.

3. The system of claim 1, wherein the control system is configured to adjust the electric machine responsive to conditions of compressor surge by adjusting an amount of torque transmitted to the compressor by the electric machine in response to a flow rate of intake air consumed by the engine.

4. The system of claim 1, wherein the control system is configured to reduce an amount of electrical energy supplied to the electric machine to reduce the surge.

5. The system of claim 1, further comprising a second electric machine rotationally coupled to a shaft of the turbine; wherein the second electric machine is configured to generate electrical energy from said extraction of exhaust flow energy by the turbine.

6. The system of claim 5, wherein the control system is further configured to supply at least a portion of the electrical energy generated by the second electric machine to the electric machine rotationally coupled to the shaft of the compressor.

7. The system of claim 5 further comprising an energy storage device, wherein the control system is further configured to supply at least a portion of the electrical energy generated by the second electric machine to the energy storage device.

8. The system of claim 1, wherein the compressor and the turbine do not rotate about the same axis of rotation.

9. The system of claim 1, wherein an axis of rotation of the compressor is not parallel to an axis of rotation of the turbine.

10. The system of claim 1, wherein the turbine is not rotationally coupled with any intake air compressor of the vehicle propulsion system.

11. A vehicle propulsion system, comprising:
an internal combustion engine including at least one cylinder;
an intake valve operable to selectively admit at least intake air to the cylinder;
an exhaust valve operable to selectively exhaust products of combustion from the cylinder;
an intake air compressor communicating with the cylinder via the intake valve;
an exhaust gas turbine communicating with the cylinder via the exhaust valve; and
a control system configured to operate the compressor at a different speed than the turbine, at least under an operating condition, to adjust an amount of opening overlap between the intake valve and the exhaust valve in response to a rotational speed of the compressor; and to adjust the amount of opening overlap in response to a rotational speed of the compressor during a first mode; and is further configured to adjust the rotational speed of the compressor in response to the amount of opening overlap during a second mode.

12. The system of claim 11, wherein the control system is further configured to adjust the amount of opening overlap in response to a rotational speed of the engine.

13. The system of claim 12, wherein the control system is configured to increase the amount of opening overlap as the rotational speed of the engine increases relative to the rotational speed of the compressor.

14. The system of claim 11, wherein the control system is further configured to adjust the amount of opening overlap in response to a rotational speed of the turbine.

15. The system of claim 14, wherein the control system is configured to increase the amount of opening overlap as the rotational speed of the turbine increases relative to the rotational speed of the compressor.

16. The system of claim 11, wherein the compressor is rotationally uncoupled from any exhaust gas turbine of the vehicle propulsion system and the exhaust gas turbine is rotationally uncoupled from any intake air compressor of the vehicle propulsion system; and wherein the compressor and the turbine rotate about different axes.

17. The system of claim 11 further comprising, a first electric machine rotationally coupled with the compressor and a second electric machine rotationally coupled with the turbine, wherein the control system is configured to operate the compressor at a different speed than the turbine by adjusting an amount of electrical energy provided to the compressor to vary the speed of the first electric machine relative to the speed of the second electric machine.

18. A method of operating an engine having a compressor and a turbine, comprising:
during a first operating condition, operating the engine in a first combustion mode while adjusting the compressor to provide a higher level of boost to the engine and operating the turbine at a first speed difference relative to the compressor; and
during a second operating condition, operating the engine in a second combustion mode while adjusting the compressor to provide a lower level of boost to the engine and operating the turbine at a second speed difference relative to the compressor.

19. The method of claim 18, wherein the first combustion mode includes a two stroke engine cycle and the second combustion mode includes a four stroke engine cycle.

20. The method of claim 18, wherein the first combustion mode includes compression ignition combustion and the second combustion mode includes spark ignition combustion.

21. The method of claim 20, wherein the compression ignition combustion includes homogeneous charge compression ignition by autoignition.

22. A method of operating a vehicle propulsion system including an internal combustion engine having an intake air compressor and an exhaust system including an exhaust turbine having a turbine generator and an exhaust treatment device arranged downstream of the turbine, the method comprising:
during a lower temperature condition of the exhaust system, operating the turbine generator to convert a lesser amount of exhaust gas energy produced by the engine to electrical energy and operating the compressor motor at a first speed difference relative to a speed of the turbine generator; and
during a higher temperature condition of the exhaust system, operating the turbine generator to convert a greater amount of exhaust gas energy to electrical energy and operating the compressor motor at a second speed difference relative to a speed of the turbine generator less than the first speed difference, wherein the temperature condition of the exhaust system includes a temperature of the exhaust treatment device; and wherein the turbine is operated during the lower temperature condition to provide a first exhaust backpressure at the engine and is operated during the higher temperature condition to provide a second exhaust backpressure at the engine greater than the first exhaust backpressure.

23. A method of operating an internal combustion engine including a first intake air compressor rotationally coupled with a first electric machine and an exhaust turbine rotationally coupled with a second electric machine, the method comprising:
in response to a first operating state of the engine:
increasing a flow of intake air through a bypass passage of the compressor relative to a flow of intake air through the compressor by opening a compressor bypass valve; and
generating a first amount electrical energy with the second electric machine by extracting exhaust gas energy flowing from the engine via the turbine; and
in response to a second operating state of the engine:
decreasing the flow of intake air through the bypass passage of the compressor relative to the flow of intake air through the compressor by closing the compressor bypass valve;
supplying electrical energy to the first electric machine to increase the rotational speed of the compressor;
generating a second amount of electrical energy greater than the first amount with the second electric machine by extracting exhaust gas energy from the engine via the turbine; and
adjusting the speed of the turbine relative to the compressor to vary the second amount of electrical energy generated by the second electric machine.

24. The method of claim 23, wherein the first operating state is an idle condition of the engine and the second operating state is a higher load condition than the first operating state.

* * * * *